(12) United States Patent
Nagurny et al.

(10) Patent No.: US 8,578,714 B2
(45) Date of Patent: Nov. 12, 2013

(54) WORKING-FLUID POWER SYSTEM FOR LOW-TEMPERATURE RANKINE CYCLES

(75) Inventors: Nicholas J. Nagurny, Manassas, VA (US); Eugene C. Jansen, Dumfries, VA (US); Chandrakant B. Panchal, Clarksville, MD (US)

(73) Assignee: Lockheed Martin Corporation, Bethesda, MD (US)

( * ) Notice: Subject to any disclaimer, the term of this patent is extended or adjusted under 35 U.S.C. 154(b) by 551 days.

(21) Appl. No.: 12/837,987

(22) Filed: Jul. 16, 2010

(65) Prior Publication Data
US 2011/0011089 A1 Jan. 20, 2011

Related U.S. Application Data

(60) Provisional application No. 61/226,466, filed on Jul. 17, 2009.

(51) Int. Cl.
*F01K 13/00* (2006.01)
(52) U.S. Cl.
USPC .................................. 60/645; 60/651; 60/670
(58) Field of Classification Search
USPC .................. 60/645, 675, 641.2, 641.3, 641.4, 60/641.5, 685, 686, 687, 688, 689, 690, 60/691, 692, 693, 694, 695, 696, 697
See application file for complete search history.

(56) References Cited

U.S. PATENT DOCUMENTS

| | | | | |
|---|---|---|---|---|
| 3,636,706 A * | 1/1972 | Minto | ............................ | 60/651 |
| 4,132,075 A * | 1/1979 | Fleck et al. | .................. | 60/641.5 |
| 4,201,060 A * | 5/1980 | Outmans | ...................... | 60/641.2 |
| 4,512,851 A * | 4/1985 | Swearingen | .................... | 203/88 |
| 5,038,567 A * | 8/1991 | Mortiz | ........................ | 60/641.5 |
| 5,095,708 A | 3/1992 | Kalina | | |
| 5,664,419 A * | 9/1997 | Kaplan | ........................ | 60/641.2 |
| 6,259,165 B1 | 7/2001 | Brewington | | |
| 6,604,572 B2 * | 8/2003 | Kawamoto | .................... | 165/133 |
| 6,694,740 B2 * | 2/2004 | Nayar | ............................. | 60/651 |
| 6,769,256 B1 * | 8/2004 | Kalina | ............................ | 60/653 |
| 7,018,450 B2 * | 3/2006 | Rojey et al. | ..................... | 95/193 |
| 7,472,549 B2 | 1/2009 | Brewington | | |
| 2003/0102354 A1 * | 6/2003 | Okamura et al. | .......... | 228/112.1 |
| 2003/0167769 A1 * | 9/2003 | Bharathan et al. | ............. | 60/676 |
| 2011/0000205 A1 * | 1/2011 | Hauer et al. | .................... | 60/511 |

FOREIGN PATENT DOCUMENTS

WO    WO 2009/027302 A2 *    3/2009

* cited by examiner

*Primary Examiner* — Kenneth Bomberg
*Assistant Examiner* — Wesley Harris
(74) *Attorney, Agent, or Firm* — Kaplan Breyer Schwarz & Ottesen, LLP

(57) ABSTRACT

A power system based on a binary power cycle and utilizing a multi-component working fluid is disclosed. The working fluid is partially vaporized and a split recirculation approach is used to control the enthalpy-temperature profiles to match the heat source. A portion of the unvaporized working fluid is sprayed into the condenser.

19 Claims, 4 Drawing Sheets

US 8,578,714 B2

WORKING-FLUID POWER SYSTEM FOR LOW-TEMPERATURE RANKINE CYCLES

STATEMENT OF RELATED CASES

This case claims priority to U.S. Provisional Patent Application 61/226,466, which was filed Jul. 17, 2009 and is incorporated by reference herein.

FIELD OF THE INVENTION

The present invention relates to low-temperature Rankine cycles.

BACKGROUND OF THE INVENTION

Enhanced Geothermal Systems ("EGS") recover geothermal energy by injecting water or other fluid into fractured rocks and use the resulting geothermal fluid as a heat source in a power conversion system. In order to make EGS economically competitive with other power-generation technologies, as much heat as possible must be recovered before the geothermal fluid is returned to the injection well.

There are three geothermal power-plant technologies available for generating electricity from hydrothermal fluids: dry steam, flash, and binary cycle. Dry steam and flash technologies are used for relatively high-temperature geothermal fluids (in excess of about 180° C.).

The binary cycle is used for recovering energy from relatively low-temperature geothermal fluids, typically in the range of about 65° C. to 150° C. The binary cycle is so named because it uses two fluids: the geothermal fluid and a working fluid. The working fluid, which has a much lower boiling point than water, is recycled in a closed loop. The working fluid is typically a refrigerant or a hydrocarbon such as isobutene, pentane, etc.

A conventional power system 100 utilizing the binary cycle for low-temperature geothermal energy recovery is depicted in FIG. 1. The power cycle implemented via system 100 is normally called the organic Rankine cycle ("ORC"). The ORC typically uses a single-component working fluid (e.g., isobutane, etc.).

In operation of system 100, the geothermal fluid is pumped, via pump 102, to heat exchanger 104. The geothermal fluid is exchanged against the working fluid in exchanger 104. The heat transferred to the relatively low-boiling working fluid causes it to boil. For that reason, heat exchanger 104 is typically referred to as a "vaporizer" or "boiler" in such systems. The working-fluid vapor flows to turbine 106, where its energy content is converted to mechanical energy as it drives the turbine. The mechanical energy is delivered, via a shaft, to generator 108, wherein the mechanical energy is converted to electrical energy.

The working-fluid vapor exits turbine 106 and flows to air-cooled condenser 110. In the condenser, the working-fluid vapor gives up heat to the air and condenses to a liquid. The condensate flows to condensate receiver 112 and is pumped, via pump 114, to preheater 116 to repeat the cycle. Geothermal fluid exiting heat exchanger (vaporizer) 104 is passed to preheater 116 to preheat the working fluid. This recovers additional heat from the geothermal fluid. Geothermal fluid is then pumped back into the ground via pump 118.

The overall economics of low-temperature geothermal heat recovery depends on the power cycle to optimize power generation (expressed as kWh/kg) from the geo-fluid. Achieving high conversion efficiency using single-component working fluids in a subcritical Rankine power cycle requires a complex and costly multi-stage ORC.

Non-azeotropic-mixture working fluids can potentially achieve high thermodynamic conversion efficiency in binary-cycle systems. In this regard, and referring now to FIG. 2, an enthalpy-temperature diagram is depicted for two types of working fluids: a single-component fluid and a binary-component fluid. As suggested by FIG. 2, with proper selection of the binary-components and composition, the enthalpy-temperature characteristics of the binary-component working fluid can potentially be closely matched with that of the geothermal fluid. The areas enveloped by the curves for each of the working fluids represent their relative conversion efficiencies. The area defined by the binary-component working fluid is significantly greater than the area under the single-component working fluid. The constant temperature difference between the geothermal fluid and the binary-component working fluid results in higher cycle efficiency than for the "pinched" single-component working fluid.

But the heat and mass transfer processes associated with vaporizing and condensing binary-component working fluids can significantly reduce their thermodynamic advantage relative to single-component fluids.

In particular, consider an ammonia-water absorption power cycle (the so-called "Kalina cycle). Although potentially well matched in terms of its enthalpy-temperature characteristic, the suitability of ammonia-water working fluid is significantly reduced by the non-equilibrium conditions that prevail during vaporization and condensation. More specifically, the bubble and dew point lines of the ammonia-water mixture do not meet except where there is pure ammonia or pure water. As such, the concentrations of the liquid and the vapor phase are never equal (the vapor phase is mostly ammonia and the liquid phase is mostly water), which creates a "temperature glide" during phase change (at which point the concentrations of the vapor and the liquid are continually changing). The thermal performance (e.g., heat transfer coefficient, etc.) for ammonia-water mixtures having a relatively larger temperature glide is compromised relative to the thermal performance of mixtures having a relatively smaller temperature glide.

There is a need, therefore, for a more efficient power cycle for use for low-temperature geothermal energy recovery.

SUMMARY OF THE INVENTION

The present invention provides a power system for geothermal and waste heat recovery that avoids some of the drawbacks of the prior art. In particular, and among any other differences, a heat recovery system in accordance with the illustrative embodiment will achieve the thermodynamic advantage of using a binary-component working fluid without incurring the significant thermal performance penalties such have been observed in the prior art (e.g., ammonia-water, etc.).

The genesis of the present invention was the inventors' recognition that the efficiency of a low-temperature geothermal and waste-heat energy-recovery system using a binary-component working-fluid can be improved by carefully addressing the following two issues:

1. Selecting a binary-component working fluid having an enthalpy-temperature characteristic that closely matches the temperature profile of the geothermal fluid as heat is being recovered and closely matches the temperature profile of the cooling media; and
2. Designing a system/equipment to avoid phase separation of the binary-component working fluid and enhancing heat and mass transfer processes, thereby maintaining thermodynamic equilibrium between the liquid and vapor phases and ameliorating the degraded thermal performance that would otherwise result.

Based on that recognition, a modified ORC cycle system was developed using a binary- or tertiary-component working fluid. In addition to using a different binary working fluid than the prior art, the system disclosed herein differs from prior-art ORC systems in terms of system layout, equipment design, implementation, and operation.

The illustrative embodiment addresses at least the following three limitations, identified by the inventors, of a conventional ORC when using binary-component working fluids:

Flooded-bundle nucleate boiling, as practiced in the prior art, should not be used for a binary-component working fluid because it provides a poor match for the temperature-enthalpy profiles.

Total evaporation of the liquid phase in the vaporizer, as practiced in the prior art, degrades thermal performance because:
  it results in a lower effective heat transfer coefficient due to dry-out of the heat transfer surface; and
  the resulting mist flow (liquid droplets in vapor flow) will adversely impact vapor/liquid equilibrium conditions.

Separation of vapor and liquid phases in the condenser, as practiced in the prior art, degrades thermal performance and results in relatively high turbine backpressure, which reduces conversion efficiency.

Some key pieces of equipment of the illustrative embodiment of the system are: a vaporizer, vapor/liquid separator, turbine/generator, recuperator, condenser, and preheater. Some of the key features of the illustrative embodiment include:

The use of a binary- or tertiary-component working fluid in a new power system configuration;

The use of counter-flow heat exchangers;

The use of a vertically-oriented vaporizer;

Operating the vaporizer for partial boiling, not total boiling;

Using a split recycle for the vaporizer to control Q-T profiles to match that of the heat source (e.g., the geothermal fluid or other waste heat source); and Using a condenser spray to lower the effective saturation pressure for a given cooling media and hence increase conversion efficiency.

In accordance with the illustrative embodiment, the working fluid, which is binary or tertiary, is fed to the vertically-oriented vaporizer with matching Q-T characteristics. The vaporizer is designed for counter-current flow; the inventors recognized that the enthalpy-temperature characteristic of the binary working fluid can best be matched to the decreasing temperature of the geothermal fluid (in the vaporizer) using a counter-flow arrangement.

The working fluid is boiled via forced-convective or thin-film evaporation in the vertically-oriented vaporizer. Flooded-bundle type nucleate boiling, as occurs in horizontally-oriented vaporizers of the prior art, should not be used for the binary-component working fluid. In a normal ORC power cycle, the working fluid is fully vaporized. As previously noted, total vaporization of the working fluid in the vaporizer, as per the prior art, significantly degrades thermal performance. In accordance with the illustrative embodiment, the amount of vaporization, which is typically between about 60 to about 80 mass percent, is controlled to match the Q-T profiles. The vertical configuration ultimately maintains vapor and liquid phases together in thermal equilibrium.

The resulting vapor and liquid phases of the working fluid are then separated in a vapor/liquid separator. The vapor flows to a turbine that drives a generator to produce electricity. The liquid phase exiting the vaporizer is rich in high-boiling-point fluid. A first portion of this liquid phase is re-circulated to the vaporizer and a second portion is cooled in the recuperator and sprayed with the incoming vapor (turbine exhaust) in the condenser. The portion sent to the condenser enables a lower pressure to be maintained, making a greater delta-P available to the turbine for higher conversion efficiency.

The heat and mass transfer issues related to binary-component working-fluid mixtures are overcome with enhanced heat exchanger designs for the vaporizer and condenser, such as using plate-fin, compact, welded plates, and enhanced shell-and-tube heat exchangers that, in some embodiments, are friction stir welded.

By controlling the total flow rate to the vaporizer as well as the flow-rate split between recirculation and condenser spray, the boiling-point range of the working fluid is adjusted to provide a desirable (i.e., more nearly optimal) energy conversion efficiency while improving heat recovery from the geothermal fluid or waste heat source. The conversion efficiency is defined as:

$$\eta_{EGS} = \text{Work}_{NET}/(\text{Total Recovered Heat from the Geothermal fluid or waste heat source})$$

This is not the Rankine cycle efficiency (based on the first law of thermodynamics and commonly used for fossil fuel plants).

DETAILED DESCRIPTION

Either a binary (two-component) or a tertiary (three-component) working fluid can be used in conjunction with the present invention. A working fluid suitable for use in conjunction with the present invention must possess an enthalpy-temperature characteristic well matched to the geothermal fluid over the temperature range of interest (i.e., the boiling and condensing temperatures of the geothermal fluid). Furthermore, isentropic expansion should produce substantially dry vapor.

In some embodiments, hydrocarbons are used as the working fluid. Non-limiting examples of binary-component, hydrocarbon-based working fluids include, without limitation, propane/isopentane and iso-butane/hexane.

Figure 1:
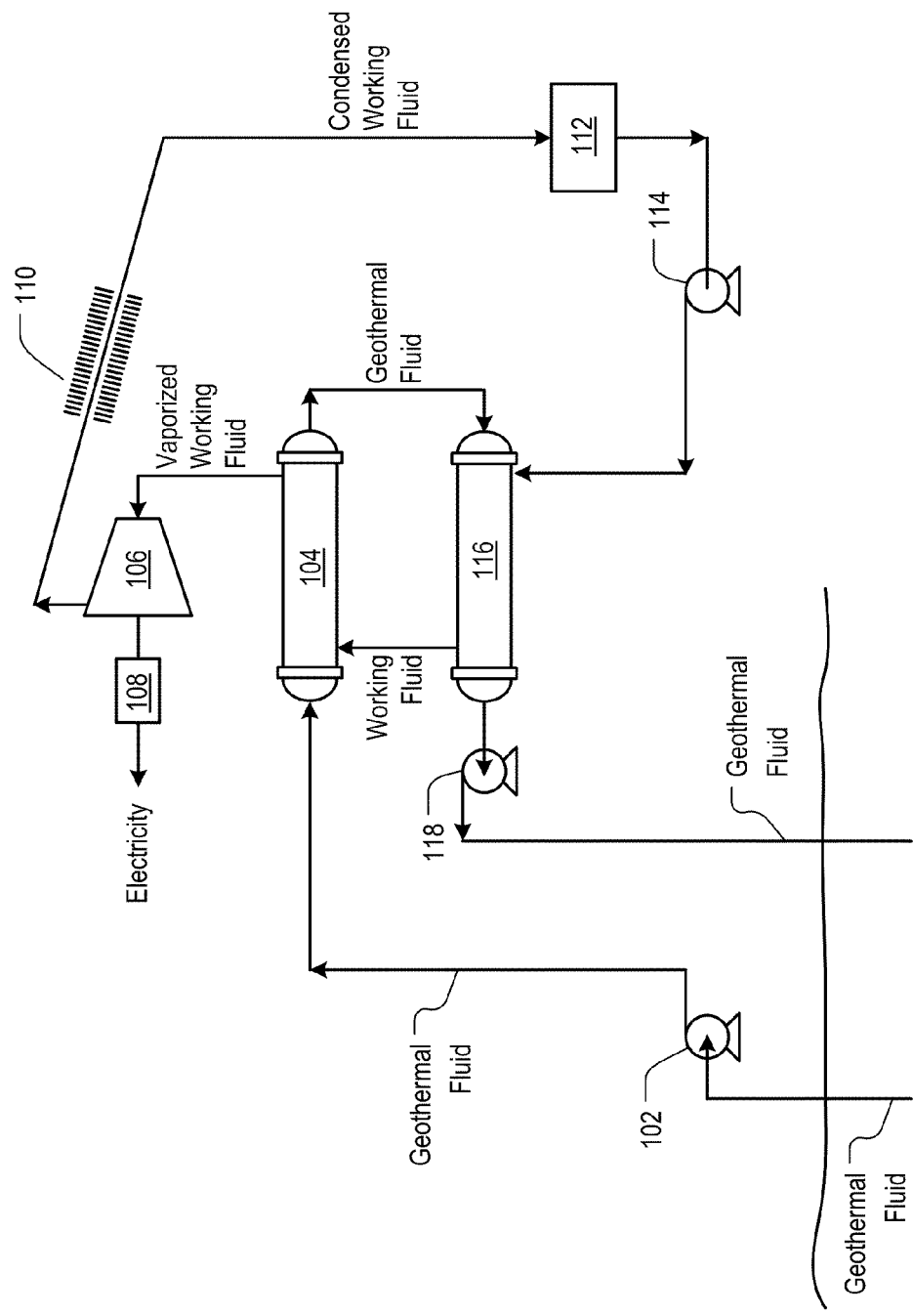
FIG. 1 depicts a conventional waste heat recovery system.
Figure 2:
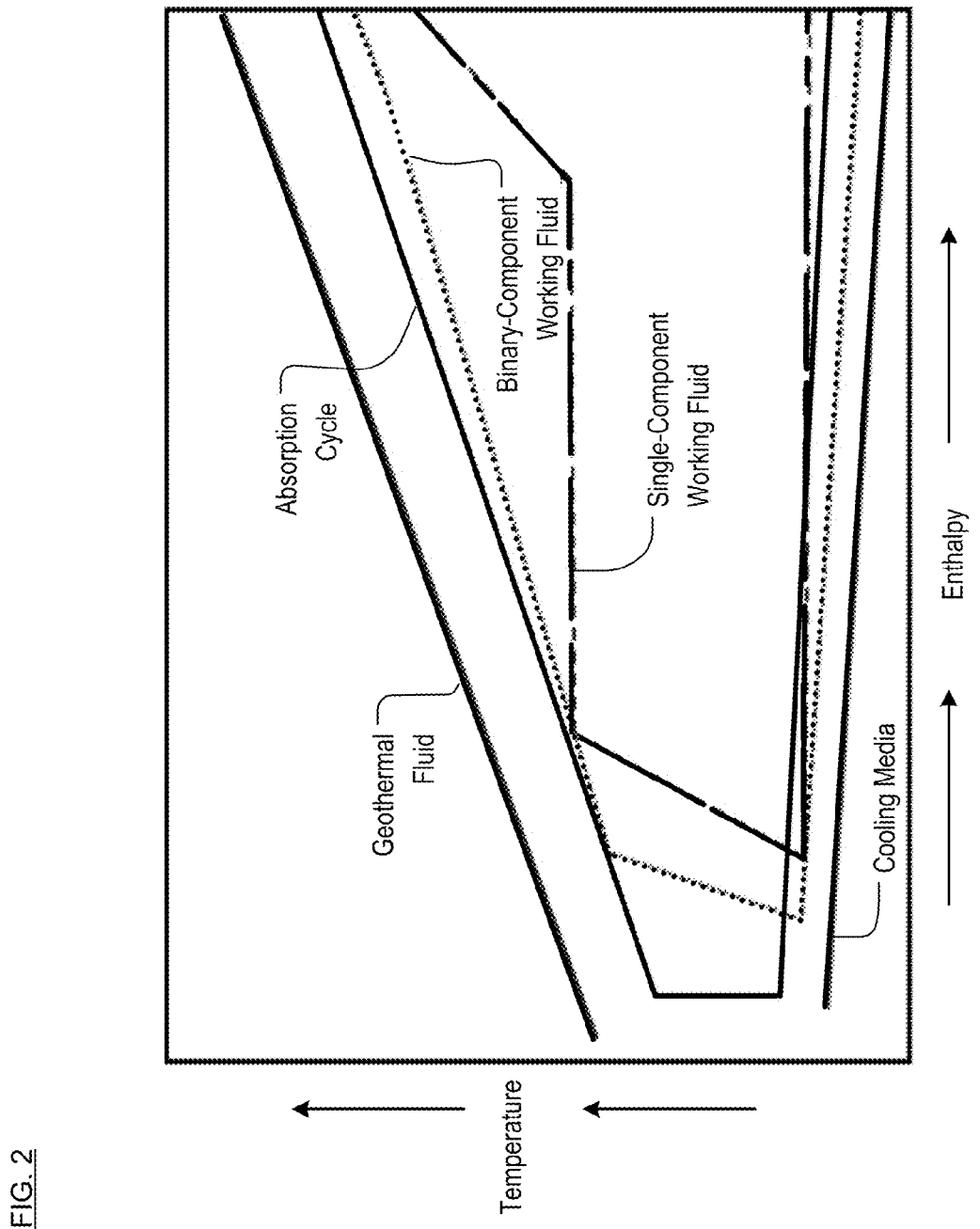
FIG. 2 depicts a temperature-enthalpy diagram of the Rankine Cycle.
Figure 3:
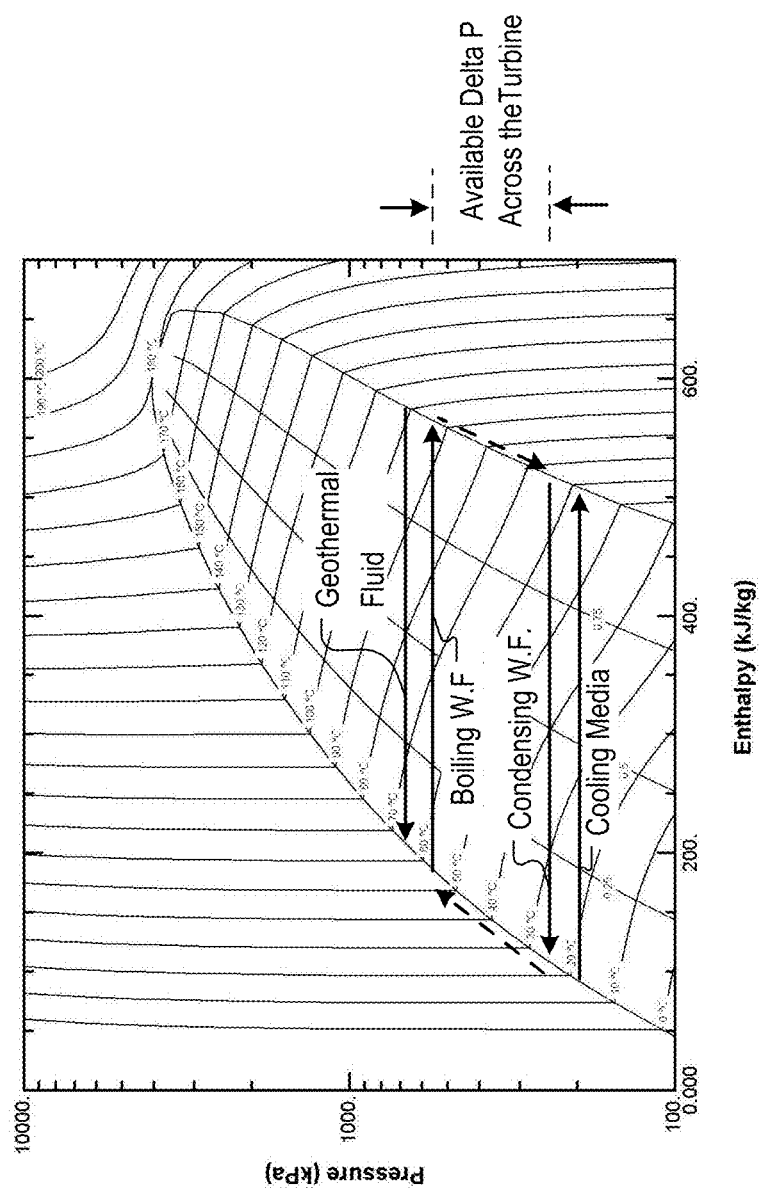
FIG. 3 depicts a thermodynamic diagram of an isobutane-hexane mixture.

FIG. 3 depicts a thermodynamic diagram of an isobutane-hexane mixture. The thermal boundaries associated with the geothermal fluid and the coolant are superimposed on the thermodynamic diagram. As depicted in FIG. 3, the thermodynamic characteristic of the isobutane-hexane mixture is an excellent match for the geothermal fluid and the cooling fluid (water or air) in terms of the available delta temperature for heat exchange. Furthermore, as indicated in FIG. 3, the isobutane-hexane mixture provides a large pressure differential across the turbine.

In some other embodiments, refrigerants are used as the working fluid, such as an R-11/R-134A mixture. Binary mixture data, as is required for determining the suitability of any particular binary- or tertiary component working fluid for a particular application, can be generated using NIST's "REF-PROP" software, available at www.nist.gov/ts/msd/srd/nist23.cfm. After the reading the present specification, those skilled in the art will know how to select an appropriate multi-component working fluid for use in conjunction with the present invention.

Figure 4:
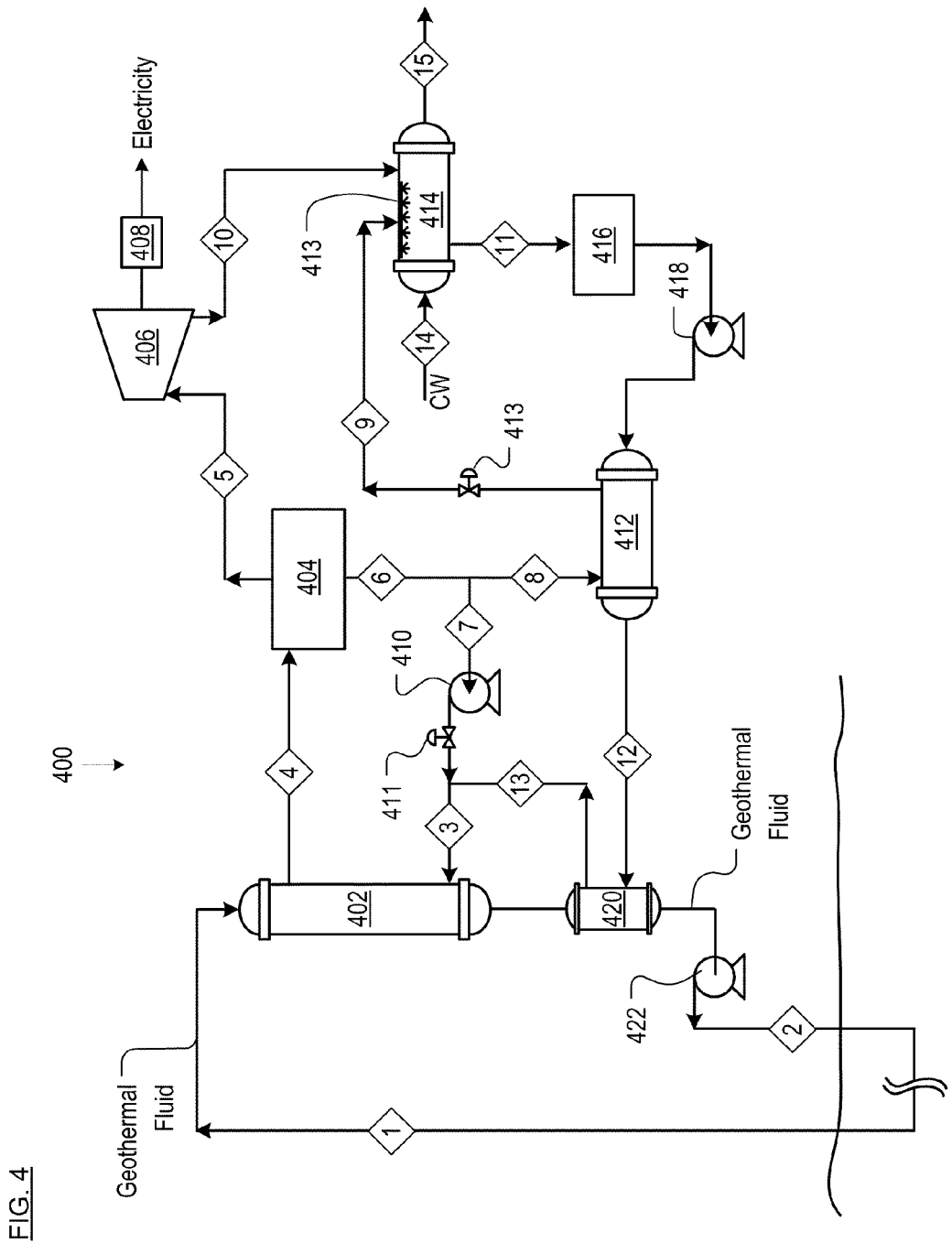
FIG. 4 depicts a low-temperature geothermal power-recovery system in accordance with the illustrative embodiment of the present invention.

FIG. 4 depicts low-temperature geothermal power-recovery system 400 in accordance with the illustrative embodiment of the present invention. System 400 includes: vaporizer 402, vapor/liquid separator 404, turbine 406, generator 408, split feed pump 410, recuperator 412, condenser 414, condensate receiver 416, condensate return pump 418, preheater 420, and geothermal fluid return pump 422, interrelated as shown.

In operation, the waste heat source, which in the illustrative embodiment is geothermal fluid 1, is fed to the top of vaporizer 402. Combined working fluid feed 3 is fed to the bottom of the column. As discussed further below, the combined feed is the combination of the condensate return after preheating (stream 13) and split-feed 7.

Overhead 4 from vaporizer 402, which is a vapor/liquid mixture, is fed to vapor/liquid separator 404. Vapor overhead 5 from vapor/liquid separator 404 is fed to turbine 406. The turbine drives generator 408 to produce electrical power.

The "bottoms" or recirculation liquid 6 from vapor/liquid separator 404 is split into two streams: split-feed 7 to vaporizer 402 and spray-liquid 8 to recuperator 412. Pump 410 is used to pressurize split-feed 7 for return to the vaporizer. Spray-liquid 8 is exchanged against the condensate return (from pump 418) in recuperator 412. The resulting cooled-spray-liquid 9 is fed via spray system 413 to condenser 414. Turbine-exhaust 10 is also fed to condenser 414. In the illustrative embodiment, cooling water 14 is used in condenser 414 to condense turbine-exhaust 10.

Condensate 11 from condenser 414 is accumulated in condensate-receiver drum 416. Pump 418, which takes suction from drum 416, pumps the condensate to recuperator 412. The condensate receives some preheat in recuperator 412 from spray-liquid 8, and the resulting stream—return-feed 12 to preheater—is fed to preheater 420.

Return-feed 12 is exchanged against the geothermal fluid exiting from the bottom of vaporizer 402. This recovers additional heat from the geothermal fluid (or other waste heat source) and, of course, preheats the condensate-sourced portion of the return feed to vaporizer 402. Thus, preheated return-feed 13 to vaporizer is combined with split feed 7 and is fed, as combined vaporizer feed 3, to the bottom of vaporizer 402.

In the illustrative embodiment, a set point controller, not depicted, controls the apportionment of liquid between streams 7 and 8 by monitoring the condensing temperature glide (i.e., the temperature glide between turbine exhaust 10 and cooled spray-liquid 9). Valve 413 functions as a throttling valve to control the flow from relatively higher pressure stream 6 (i.e., recirculation liquid) to the relatively lower pressure stream 9 (i.e., cooled spray-liquid). In order to ensure control of the split flow, an additional valve—valve 411—is used. Valve 411 is preferably disposed on the discharge side of pump 410 to avoid flashing. In this arrangement, valves 411 and 413 act independently of each other; in some alternative arrangements, one of the valves could be slaved to the other.

Pump 422, which takes suction from preheater 420, pumps geothermal fluid return 2 back into the ground. Some of the key items of system 400 are now discussed in further detail.

Vaporizer 402 functions to recover geothermal (or waste) source heat and vaporize the binary- or tertiary-component working fluid. In vaporizer 402, the temperature profile of the vaporizing working-fluid mixture is maintained close to temperature profile of the geothermal fluid (or other waste heat source) by:
- suitably selecting the binary- (or tertiary-) component working fluid;
- appropriately selecting the vaporizer operating pressure;
- designing and operating the vaporizer for partial vaporization of the working fluid;
- designing the vaporizer for a low fouling propensity on the geothermal fluid side; and
- designing the vaporizer for true counter-current flow.

In accordance with the illustrative embodiment, the mass fraction of vapor in overhead 4 from vaporizer 402 to vapor/liquid separator 404 is in the range of about 60 percent to about 80 percent. Among any other benefits, this avoids dry-out of heat exchange surfaces, wherein such dry-out causes non-equilibrium conditions of binary-component working fluids.

In presently preferred embodiments, vaporizer 402 comprises an aluminum shell and tube heat exchanger wherein friction-stir welding is used to minimize joint corrosion. See, for example, U.S. patent application Ser. No. 12/484,542 filed Jun. 15, 2009 and Ser. No. 12/828,733 filed Jul. 1, 2010, both of which are incorporated by reference herein. In some embodiments, vaporizer 402 includes fins on the working-fluid side for extending the heat transfer surface. In addition to increasing the surface area for heat transfer, the use of fins on the working-fluid side of vaporizer 402 facilitates contact between the liquid and vapor phases to maintain equilibrium conditions. In some embodiments, the vaporizer 402 is modified to include extruded geothermal-fluid passages. In embodiments in which the geothermal fluid has little potential for causing equipment corrosion, aluminum fins can also be used on the geothermal-fluid side of vaporizer 402.

In some embodiments, vaporizer 402 comprises twisted or spirally-fluted tubes to enhance the heat transfer coefficient. See U.S. patent application Ser. No. 12/836,688 filed Jul. 15, 2010, which is incorporated by reference herein. In yet some further embodiments, vaporizer 402 comprises a brazed aluminum plate-fin heat exchanger, such as has been developed for ocean thermal energy conversion ("OTEC") plants. See, for example, U.S. patent application Ser. No. 12/484,542 filed Jun. 15, 2009 and Ser. No. 12/828,733 filed Jul. 1, 2010, both of which are incorporated by reference herein. After reading this specification, those skilled in the art will be able to design, build, and use vaporizer 402.

Vapor/liquid separator 404 is a conventional unit for separating vapor and liquid as is commercially available. In the illustrative embodiment, separator 404 includes a demister to reduce or eliminate liquid-droplet carryover in vapor-overhead 5 to turbine 406.

Turbine 406 and generator 408 are conventional and commercially available equipment developed for ORC systems. This equipment would potentially be subject to some modification based on the specific binary-component working fluid being used. For example, in some embodiments, the turbine blades of turbine 406 are designed specifically for use with the selected working fluid and/or the turbine is fitted with improved shaft bearings. After reading the present specification, those skilled in the art will be capable of making such modifications.

Condenser 414 condenses turbine-exhaust 10 at the lowest pressure possible for the system. Directionally, the lower the pressure in condenser 414, the greater the power generation and, as such, the better the overall thermal conversion efficiency of system 400.

In accordance with the illustrative embodiment, condenser 414 includes spray system 413, the purpose of which is to lower the saturation temperature (and hence condenser pressure) of turbine-exhaust 10. This is achieved by spraying spray-liquid 9, which contains a relatively higher concentration of high-boiling fluid than turbine exhaust 10, into condenser 414.

In embodiments in which condenser 414 is implemented as a horizontal shell-and-tube exchanger fitted with enhanced tubes, spray-liquid 9 is advantageously distributed via spray system 413 at the vapor inlet as well as along the length of the condenser to counter any possible liquid separation from the tube bundle. In embodiments in which condenser 414 is implemented as a vertical shell-and-tube, compact plate, or plate-fin exchanger, spray-liquid 9 is sprayed into turbine-exhaust 10 as fine droplets to establish equilibrium.

In some embodiments, both spray-liquid 9 and turbine-exhaust 10 are sprayed into condenser 414 via spray system 413. In some other embodiments, spray system 413 comprises a distributor that introduces spray liquid 9 along the length of the condenser to maintain optimum temperature profiles to match cooling media 14. In the illustrative embodiment, cooling media 14 is water; in some other embodiments, air is used as the cooling media. It is within the capabilities of those skilled in the art to design, engineer, and/or specify a spray/distribution system for use with condenser 414.

In accordance with the illustrative embodiment, vapor and liquid phases are maintained at equilibrium conditions along the length of condenser 414. This is done by:
- avoiding, to the extent possible, the separation of condensate 11 from the vapor phase (i.e., keeping vapor and liquid phases flowing together);
- providing enhanced heat-exchange surfaces to reduce effective heat and mass transfer resistances; and
- designing for a low fouling rate on the cooling media side.

In presently preferred embodiments, condenser 414, like vaporizer 402, comprises an aluminum shell and tube heat exchanger wherein friction-stir welding is used to minimize joint corrosion. The enhanced heat-exchange surfaces include, in various embodiments, fins (on either or both sides of the condenser) on the working-fluid side for extending the heat transfer surface. In some additional embodiments, condenser 414 comprises twisted or spirally-fluted tubes to extend the surface for heat transfer. In yet some further embodiments, condenser 414 comprises a brazed aluminum plate-fin heat exchanger. The previously referenced patent applications provide additional information relevant to the design of such heat exchangers. After reading this specification, those skilled in the art will be able to design, build, and use condenser 414.

Recuperator 412 recovers heat from the spray liquid (stream 8) and uses it to pre-preheat the return-feed 12 before it enters preheater 420. In some embodiments, recuperator 412 comprises commercially available heat exchangers, such as semi-welded or brazed plate heat exchangers.

Preheater 420 preheats return-feed 12 so that combined-feed 3 at the inlet to vaporizer 414 is close to its bubble point. This reduces the duty requirement of vaporizer 402 (i.e., it reduces the energy required to bring the working fluid mixture to its boiling point). To the extent that the sub-cooled combined-feed 3 requires heating in vaporizer 402 to boil, the overall thermal performance of system 400 is reduced. Preheating return-feed 12 recovers additional heat from geothermal fluid or other waste heat source. This increases the overall thermal conversion efficiency of the process.

As previously discussed, recirculation-liquid 6 from vapor/liquid separator 404 is split into two streams: split-feed 7 to vaporizer 402 and spray-stream 8 flowing to condenser 414. The primary function for this split is to match the saturation condensing temperature with temperature profile of the cooling media without significant heat loss.

The temperature profile (temperature change) of the geothermal fluid or other waste heat source and the temperature profile of the cooling media may or may not be similar. By splitting recirculation-liquid 6 into two streams, as disclosed herein, the temperature profile of the working fluid can be made to match both the heat source and heat rejection for the power cycle.

EXAMPLE

Table 1 below depicts process stream data for a variety of state points throughout system 400 based on an isobutane/hexane working fluid. For the purposes of this example, pressure drop in equipment and piping is not considered. The data appearing in Table 1 was generating by NIST REPPROP software, version 8. An arbitrary feed rate of 100 kilograms/second was assumed.

TABLE 1

| | Process Stream Data for System 400 for iso-butane/hexane Working Fluid | | | | |
|---|---|---|---|---|---|
| Stream | Temp <° C.> | Press <kPa> | Flow <Kg/s> | Vapor Mass Fraction | Mass Fraction of Iso-butane |
| 1 | 96 | | | | |
| 2 | 66 | | | | |
| 3 | 57 | 555 | 100 | 0.00 | 0.57 |
| 4 | 88 | 555 | 100 | 0.75 | 0.57 |
| 5 | 88 | 555 | 75 | 1.00 | 0.68 |
| 6 | 32 | 555 | 25 | 0.00 | 0.24 |
| 7 | 88 | 555 | 10 | 0.00 | 0.24 |
| 8 | 88 | 555 | 15 | 0.00 | 0.24 |
| 9 | 32 | 269 | 15 | 0.00 | 0.24 |
| 10 | 49 | 269 | 75 | 1.00 | 0.68 |
| 11 | 27 | 269 | 90 | 0.00 | 0.61 |
| 12 | 36 | 555 | 90 | 0.00 | 0.61 |
| 13 | 57 | 555 | 90 | 0.00 | 0.61 |
| 14 | 21 | | | | |
| 15 | 43 | | | | |

For this Example, the mass fraction of working fluid that is vaporized in vaporizer 402 is seventy five percent, which is between the preferred sixty to eighty percent.

In the Example, the split between split-feed 7 and spray-stream 8 is 40 percent of the mass flow apportioned to the split-feed and 60 percent to the spray-stream 8. Exchanging spray-stream 8 against condensate 11 in recuperator 412 advantageously reduces the temperature of the spray-stream from 88° C. to 32° C. (see stream 9) before it is sprayed into condenser 414. This heat exchange provides some preheat to condensate 11, increasing its temperature from 27° C. to 36° C. (see, stream 12). In the example, cooling water 14 is used to condense turbine exhaust 10. After absorbing heat from turbine exhaust 10 (and spray stream 9), cooling water 15 exits condenser 414 at 43° C.

Additional heat is recovered from geothermal fluid by exchanging it against stream 12 (which has already received some preheat in recuperator 412) in preheater 420. This increases the temperature of stream 12 from 36° C. to 57° C. (see stream 13). The bubble point of vaporizer feed 3 is 57° C.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A system comprising:
    a vaporizer, wherein the vaporizer partially vaporizes a working fluid using the heat from a waste-heat fluid, wherein the working fluid comprises at least two components and wherein the process includes a single stage of vaporization;
    a vapor/liquid separator disposed downstream of the vaporizer, wherein the vapor/liquid separator receives vapor and liquid resulting from the partial vaporization of the working fluid in the vaporizer;
    a turbine that drives a generator to produce electricity, wherein the turbine is driven exclusively by the vapor received from the vapor/liquid separator and without further heating thereof;
    a condenser that condenses the vapor that exits the turbine;
    a split recycle, wherein a first portion of the liquid exiting the vapor/liquid separator is recirculated to the vaporizer and a second portion of the liquid exiting the vapor/liquid separator is circulated to condenser, wherein the relative amounts of the first portion and the second portion is selected to provide a desired conversion efficiency of heat from the waste-heat fluid into electricity.

2. The system of claim 1 wherein the condenser comprises a plurality of nozzles that receive the second portion of liquid and sprays the second portion of liquid into the condenser.

3. The system of claim 1 wherein the vaporizer is vertically oriented for operation.

4. The system of claim 3 wherein the vaporizer is a counter-current flow heat exchanger, wherein the waste-heat fluid flows downward in the vaporizer and the working fluid flows upward through the vaporizer.

5. The system of claim 1 wherein the vaporizer comprises an aluminum shell and tube heat exchanger, wherein at least some welds within the vaporizer are formed via friction-stir welding.

6. The system of claim 1 wherein the vaporizer comprises aluminum fins, wherein the fins increase an amount area for heat transfer between the waste-heat fluid and the working fluid.

7. The system of claim 1 wherein a temperature of the waste-heat fluid, before entering the vaporizer, is in a range of about 65° C. to about 150° C.

8. The system of claim 1 wherein the at least two components are both hydrocarbons.

9. The system of claim 8 wherein the at least two components are propane and isopentane.

10. The system of claim 8 wherein the at least two components are isobutene and hexane.

11. A method comprising:
    adding a waste-heat liquid to a top of a vertical vaporizer;
    partially boiling a working fluid, via a single stage of vaporization, in the vertical vaporizer to provide a vapor and a liquid;
    separating the vapor and the liquid from one another;
    flowing the vapor to a turbine, wherein the vapor is not heated after being separated from the liquid;
    driving the turbine with the vapor; and
    adjusting the boiling point of the working fluid by recirculating, to the vertical vaporizer, a first portion, but not all, of the liquid that was separated from the vapor.

12. The method of claim 11 wherein a temperature of the waste-heat liquid is in a range of about 65° C. to about 150° C. before the waste-heat liquid is added to the vertical vaporizer.

13. The method of claim 11 wherein the operation of partially boiling further comprises vaporizing about 60 mass percent to about 80 mass percent of the working fluid in the vertical vaporizer.

14. The method of claim 11 further comprising condensing the vapor after it exits the turbine, wherein the vapor is condensed in a condenser to form a condensate.

15. The method of claim 14 further comprising directing a second portion of the liquid to the condenser, wherein the second portion of the liquid is what remains of the liquid after the first portion is recirculated to the vertical vaporizer.

16. The method of claim 15 wherein the operation of directing further comprises spraying the second portion of the liquid into the condenser.

17. The method of claim 15 further comprising removing heat from the second portion of the liquid by thermally coupling the condensate and the second portion of the liquid before the second portion enters the condenser.

18. The method of claim 14 further comprising adding the condensate and the first portion of the liquid to a bottom of the vaporizer.

19. The method of claim 18 wherein the operation of adding the condensate further comprises preheating the condensate by thermally coupling the condensate to the waste-heat liquid after the waste-heat liquid exits the vertical vaporizer.

* * * * *